United States Patent
Murakawa (10) Patent No.: US 8,589,676 B2
(45) Date of Patent: Nov. 19, 2013

(54) COMMUNICATION SYSTEM AND METHOD IN PUBLIC KEY INFRASTRUCTURE

(75) Inventor: Akira Murakawa, Toyonaka (JP)

(73) Assignee: Minolta Co., Ltd., Chuo-Ku (JP)

( * ) Notice: Subject to any disclaimer, the term of this patent is extended or adjusted under 35 U.S.C. 154(b) by 37 days.

(21) Appl. No.: 12/847,705

(22) Filed: Jul. 30, 2010

(65) Prior Publication Data

US 2010/0299520 A1 Nov. 25, 2010

Related U.S. Application Data

(62) Division of application No. 10/671,548, filed on Sep. 29, 2003, now Pat. No. 7,797,533.

(30) Foreign Application Priority Data

Jun. 12, 2003 (JP) ................................. 2003-167691

(51) Int. Cl.
*H04L 29/06* (2006.01)

(52) U.S. Cl.
USPC ......................................................... 713/156

(58) Field of Classification Search
USPC ......................................................... 713/156
See application file for complete search history.

(56) References Cited

U.S. PATENT DOCUMENTS

| 5,633,932 | A | 5/1997 | Davis et al. |
|---|---|---|---|
| 6,012,100 | A | 1/2000 | Frailong et al. |
| 6,047,242 | A | 4/2000 | Benson |
| 6,397,329 | B1 | 5/2002 | Aiello et al. |
| 6,684,336 | B1 * | 1/2004 | Banks et al. .................. 709/227 |
| 6,816,900 | B1 | 11/2004 | Vogel et al. |
| 6,918,042 | B1 * | 7/2005 | Debry ............................... 726/5 |
| 7,047,404 | B1 | 5/2006 | Doonan et al. |
| 7,103,774 | B2 | 9/2006 | Wildish et al. |
| 7,168,003 | B2 | 1/2007 | Lozano et al. |
| 2001/0034834 | A1 | 10/2001 | Matsuyama et al. |
| 2001/0044898 | A1 | 11/2001 | Benussi et al. |
| 2004/0088548 | A1 * | 5/2004 | Smetters et al. .............. 713/175 |
| 2004/0109568 | A1 | 6/2004 | Slick et al. |

FOREIGN PATENT DOCUMENTS

| JP | 10-215245 A | 8/1998 |
|---|---|---|
| JP | 2001-202436 A | 7/2001 |
| JP | 2001-320356 A | 11/2001 |
| JP | 2002-259108 A | 9/2002 |

OTHER PUBLICATIONS

"HP Jetdirect Print Servers," Hewlett-Packard, Jul. 2003, pp. 1-3, 144-151, Edition 2, USA (with partial translation of p. 146 Edition 1).
"HP Jetdirect Print Servers," Hewlett-Packard, Apr. 2002, pp. 1-3; 122-127, Edition 1.
Schneier, B., Applied Cryptography, 2nd Edition, 1996, John Wiley and Sons, pp. 32, 32 and 37.

* cited by examiner

*Primary Examiner* — Jason Gee
(74) *Attorney, Agent, or Firm* — Buchanan Ingersoll & Rooney PC

(57) ABSTRACT

In a communication system wherein a device and a client communicate data with each other through a network, the device holds a root certificate including a public key in a pair of the public key and a private key and signed with the public key. When data is sent, a certificate creator creates a second certificate including the root certificate designated as a certificate authority at a higher level and signed with the root certificate, and the second certificate is sent to the client. In the client, the root certificate has been stored beforehand, and a verifier verifies the signature of the second certificate with the root certificate.

22 Claims, 9 Drawing Sheets

Fig.12

COMMUNICATION SYSTEM AND METHOD IN PUBLIC KEY INFRASTRUCTURE

This application is a divisional of application Ser. No. 10/671,548, filed on Sep. 29, 2003, which is based on and claims priority under 35 U.S.C. §119 with respect to Japanese Application No. 2003-167691 filed on Jun. 12, 2003. The entire content of the prior applications is incorporated herein by reference.

BACKGROUND OF THE INVENTION

1. Field of the Invention

The present invention relates to data communication using a public key in a network environment.

2. Description of Prior Art

In public key encryption for data communication in a network, when a sending end transmits data to a receiving end, a pair of a public key and a private key (secret key) is created, and data to be transmitted is encrypted with the private key. Then the encrypted data is transmitted. At the receiving end, the data is decrypted with the public key. Public key infrastructure (PKI) uses the public key encryption and organizes certificate authorities as third parties to issue an electronic certificate (hereinafter referred to as certificate) for verifying the identity of the sending end. A public key to be used for decrypting the certificate is sent through a certificate authority. When the sending end transmits data, it calculates a hash value on the data, and encrypts the data and the hash value with the private key for an electronic signature. Then, the sending end requests the certificate authority to issue a certificate, and the certificate authority creates a pair of a public key and a private key and issues an electronic certificate. In the electronic certificate, information including the public key of the sending end is encrypted with the private key of the certificate authority. The sending end performs an electronic signature to the data by using a hash value, adds the signature to the certificate issued by the certificate authority and sends them as well as the data to a receiving end. The receiving end gets the public key for the certificate from the certificate authority, decrypts the certificate with the public key to get the public key of the sending end. Thus, the identity of the sending end of the electronic signature can be confirmed, and the security is enhanced. Then, the data and the hash value are decrypted with the public key of the sending end. By decrypting the hash value, the forgery of the data can be checked. Further, by decrypting the data, it is verified that the data is sent by the sending end. A user requests a certificate authority to issue a certificate for each created public key. A data communication system which simplifies the issuance of a certificate is described in, for example, Japanese Patent laid open Publication 2001-320356.

In the public key infrastructure (PKI), certificate authorities are organized in a hierarchical structure. Certificate authorities at the highest level is called root certificate authorities. A series of certificates are signed by a series of certificate authorities up to the root certificate authority in a hierarchical order. A certificate of a certificate authority is used for verification of the public key of a subordinate certificate authority in the hierarchical order. Thus, for the verification of a certificate, a chain of certificates or an entire list up to the root certificate authority has to be acquired.

Recently, secure encrypted communication such as Secure Sockets Layer (SSL) communication is needed in a network environment. SSL is a communication protocol for transmitting encrypted data between a web server and a web browser, wherein public key encryption and electronic certificates are used to send data securely. For secure data communication with use of SSL protocol or the like, a server apparatus which sends data needs a certificate. A certificate can be purchased from an external certificate authority which gives a service to issue a certificate. However, in a network such as an intranet, a user would not want to buy an expensive certificate from an authority outside the network only for SSL communication. On the other hand, a certificate may be created by a server apparatus. However, when a certificate created by the server apparatus is used, because the certificate is not issued by a certificate authority, a warning is given in a warning dialog in the screen of the server apparatus to inform the user of that the certificate is not trusted. This is because a list of certificates up to the root certificate authority is not available.

SUMMARY OF THE INVENTION

An object of the invention is to provide a network system wherein a server and a client communicate encrypted data between them through a network without purchasing an electronic certificate from an authority outside the network.

In one aspect of the invention of a communication system wherein a device and a client communicate with each other through a network, the device comprises a first storage device which stores a root certificate including a public key in a pair of the public key and a private key and signed with the public key, a certificate creator which creates a second certificate including the root certificate designated as a certificate authority at high level and signed with the private key, and a communication device which transmits the second certificate created by said certificate creator. The client comprises a second storage device which stores the root certificate stored in said first storage device, and a verifier which verifies the signature of the second certificate received from said device with the public key.

In another aspect of the invention of a device to be used in a communication system between the device and a client through a network wherein the device sends information to a client and the client uses the information to communicate with the device, the device comprises a first storage device which stores a pair of a public key and a private key, a second storage device which stores a root certificate signed with the public key, and an interface which sends the information as well as the public key to the client through the network. The root certificate is sent through said interface to the client for verification of the information by the client.

An advantage of the invention is that because a root certificate of the server has been installed in the client, a warning is not given when secure encrypted communication from the server to the client is started.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
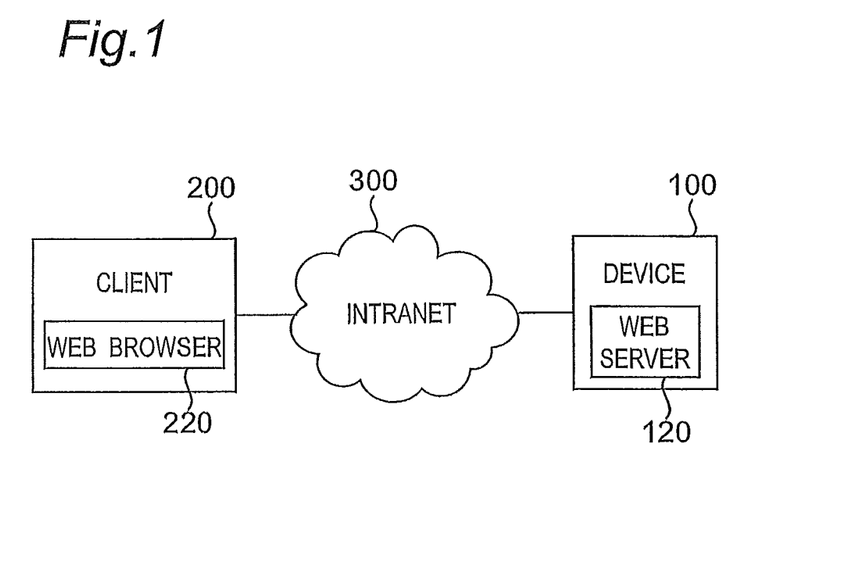
FIG. 1 is a block diagram of a data communication system.

Referring now to the drawings, wherein like reference characters designate like or corresponding parts throughout the several views, FIG. 1 shows a data communication system for communicating data through a network. A device 100 such as a printer or a multifunctional peripheral (MFP) and a client 200 such as a personal computer are connected to a network 300 such as an intranet or a local area network. In the network 300, Secure Sockets Layer (SSL) is used as a communication protocol. The device is operated as a server for the client 200, and it has a web server 120 which supports SSL. The client 200 is for example a personal computer (PC) and has a web browser (referred also to a browser) 216 which supports SSL. The web server 120 of the device 100 and the browser 216 of the client 200 can transmit data each other by using SSL. Though only one device 100 and only one client 200 are shown in FIG. 1, a plurality of devices 100 and a plurality of clients 200 can be connected to the network 300 generally.

Figure 2:
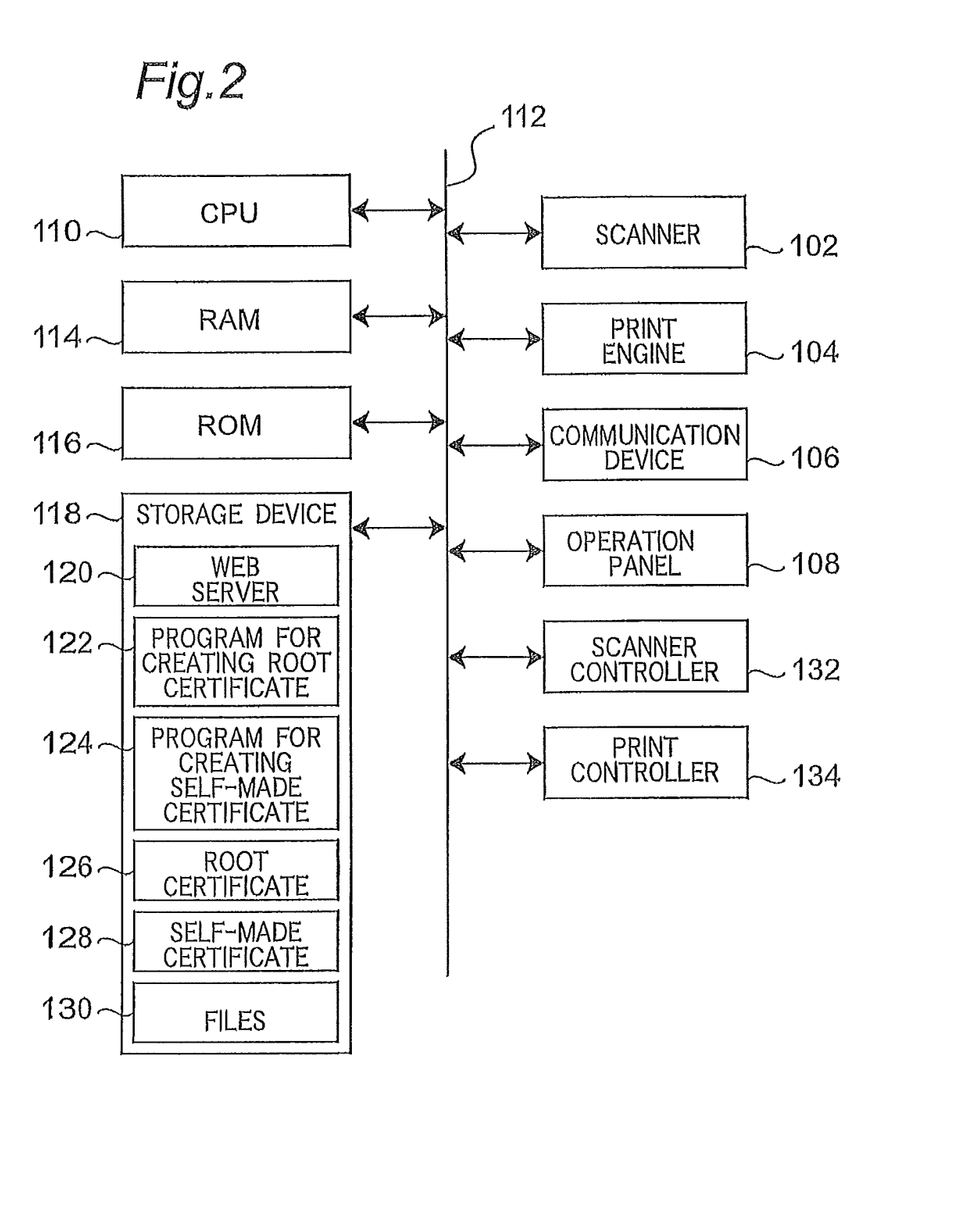
FIG. 2 is a block diagram of a multi-functional peripheral.

FIG. 2 shows an internal structure of a multifunctional peripheral as an example of the device 100. The multifunctional peripheral has a scanner 102 for reading a document image, a print engine 104 for printing an image, a communication device 106 for communication through the network 300, and an operation panel 108 for user's instruction of an operation and for display. Further, a central processing unit (CPU) 110 is connected through an internal bus 112 to a random access memory (RAM) 114, a read-only memory (ROM) 116, a storage device 118 such as a hard disk drive, a scanner controller 132 and a print controller 134 as well as the above-mentioned components 102-108. The scanner controller 132 controls the scanner 102, and the print controller 134 controls the print engine 104. The multifunctional peripheral serves as a printer, a copying machine, a scanner and the like. The storage device 118 stores programs such as the web server 120 supporting SSL, a program 122 for creating a root certificate, and a program 124 for creating a self-made certificate, and data such as a root certificate 126, a self-made certificate 128 and files 130.

Figure 3:
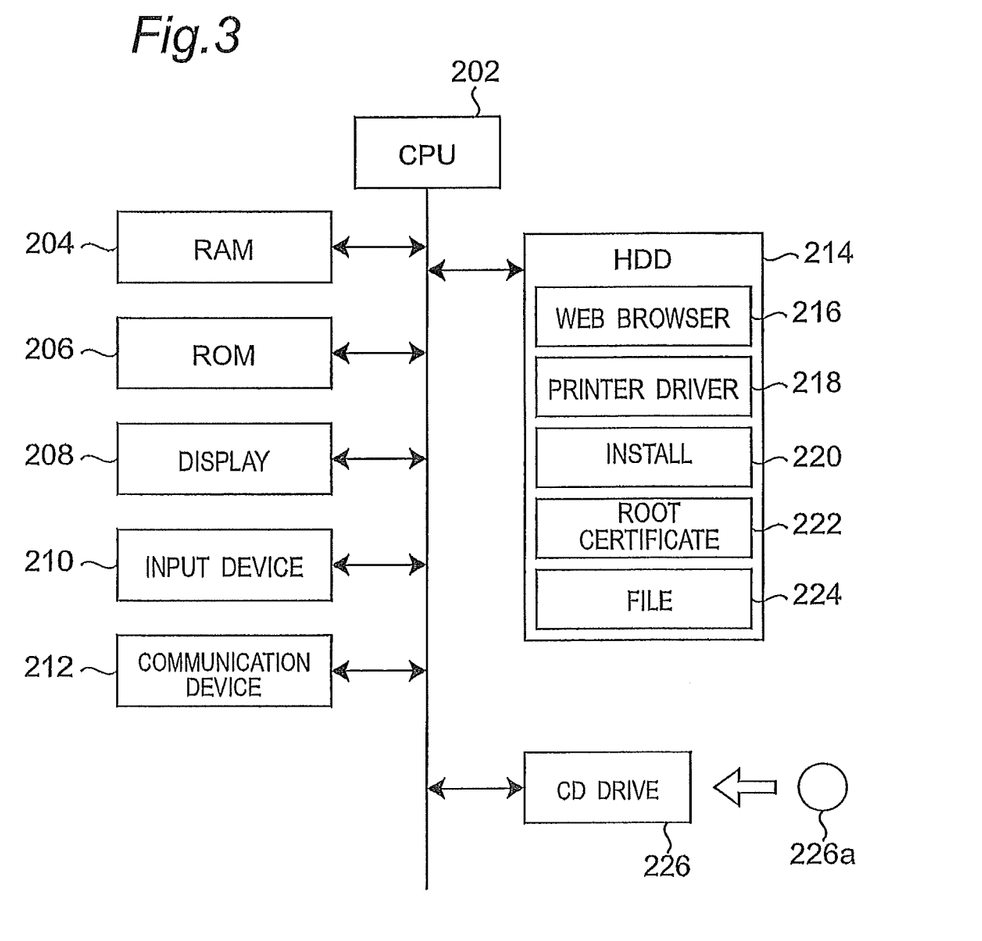
FIG. 3 is a block diagram of a personal computer.

FIG. 3 shows an internal structure of a personal computer as an example of the client 200. The personal computer has a central processing unit (CPU) 202 which controls the entire system, and a random access memory (RAM) 114 and a read-only memory (ROM) 116 both connected to the CPU 202. The CPU 202 is further connected to a display device 208, input devices 210 such as a keyboard and a mouse, and a communication device 212 for communication through the network 300. The CPU 202 is also connected to a hard disk drive (HDD) 214 for storing programs and data, and a CD drive 226 for access with a compact disk (CD) 226a. A storage device such as the hard disk or the compact disc stores programs such as an operating system (not shown), the web browser 216 supporting SSL, a printer driver 218, and a program 220 for installing a root certificate to the client 200, and data such as a root certificate 222, and files 224 to be transmitted. The printer driver 218 generates print data to be sent to a printer or multifunctional peripheral as one of the devices 100.

In the device 100 and the client 200, programs and data can be stored in storage devices such as the hard disk in the storage device 118 and the hard disk drive 214, but they can also be stored in a flexible disk or various optical disks such as a compact disk 226a. The storage device such as a flexible disk or an optical disk can be accessed by a drive therefor.

When the web server 120 in the device 100 and the web browser 216 in the client 200 transmit data between them in SSL protocol, the device (or server) is verified, the client is verified, and the contents of communication is encrypted. The device 100 holds the root certificate 122. The root certificate 122 may be created by the device 100 itself or issued by a certificate authority (CA). In this embodiment it is created by the device 100, as will be explained later. When the root certificate is created by the device 100, it is an advantage that the attributes of the root certificate can be changed freely by the device. The root certificate 122 includes a public key created when the root certificate is created. On the other hand, the root certificate 122 has also been installed in the client 200 beforehand. This is the above-mentioned root certificate 220 stored in the client 200. The installation of a root certificate is preferably performed automatically. For example, it is installed when the printer driver 218 for the device 100 is installed in the client 200. Preferably, before the root certificate is installed, it is requested for a user to approve the installation. Because the client 200 holds the root certificate 220, a certificate issued by a certificate authority outside the network 300 is not needed to verify the certificate received from the device 100, as will be explained later. If a storage device such as ROM 206 storing the root certificate 220 is supplied to the client 200, forgery of the root certificate is prevented.

A certificate is created in X.509 format by the programs 122, 124 in the device 100. A certificate in X.509 format contains information including the version thereof, a serial number thereof, a signature value, an algorithm and parameters used for the signature, name, address and the like of the issuer of the certificate, the expiry date, name, address and the like of an owner, and information on the public key to be verified. When a user inputs necessary information in response to an input request in the screen, a certificate is created based on the information. A certificate in X.509 format is stored in ASN.1 format inside, but it is stored in a format such as PKCS#12 or PKCS#7 outside. When a self-made certificate is created by the program 124, the root certificate is written in the certificate as the name of the issuer of the root certificate.

Figure 4:
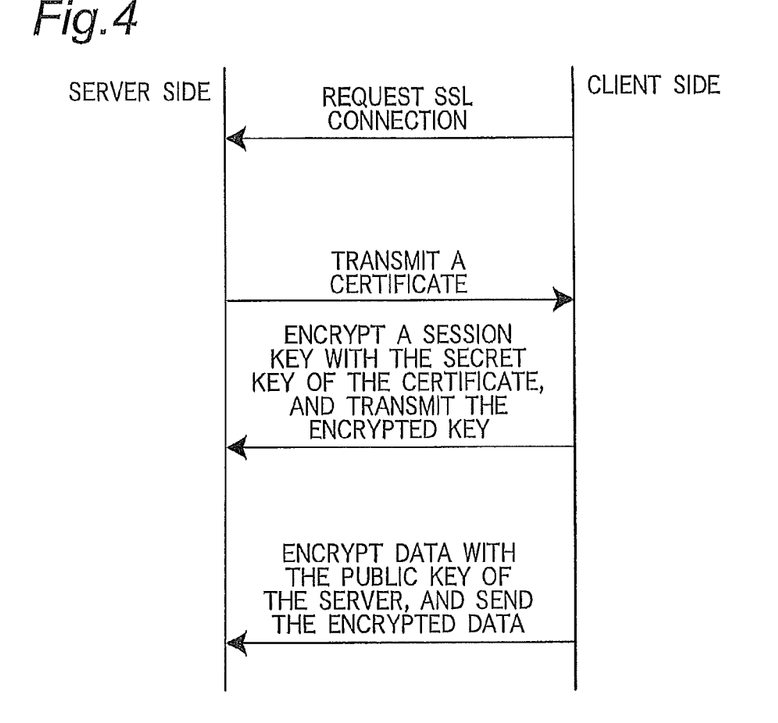
FIG. 4 is a diagram of a communication sequence in SSL between a server and a client.

SSL communication is explained here. A public key and a private key are provided beforehand in the web server 102 in the device 100. As shown in FIG. 4, when the client 200 requests SSL connection to the device 100, the device 100 determines an algorithm for encryption and compression to be used, notifies them to the client 200, creates a certificate (self-made certificate) in X.509 format including the public key of the device, and sends the certificate as well as a list of certificates up to the root certificate authority (a certificate chain). The client 200 decrypts the certificate with the public key of the certificates already installed in the client 200 and performs verification up to the root certificate to decide that the identity of the certificate is trusted. If necessary, communication for the client verification is performed.

In the encrypted communication following the verification, a session key (common key) is used for encryption in data communication. Then, the client 200 encrypts the information for creating the session key with the public key included in the certificate of the device and sends the encrypted information to the device 100. The device 100 decrypts the information with the private key of the certificate to get the session key. Thereafter, communication of data generated in an application program and encrypted becomes possible.

Figure 5:
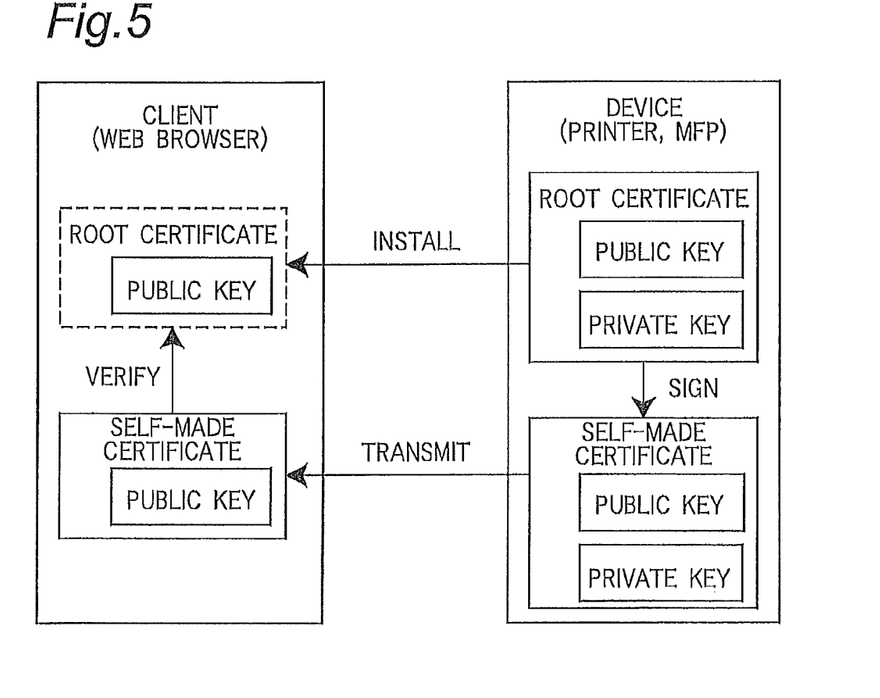
FIG. 5 is a diagram for explaining a root certificate and a self-made certificate.
Figure 6:
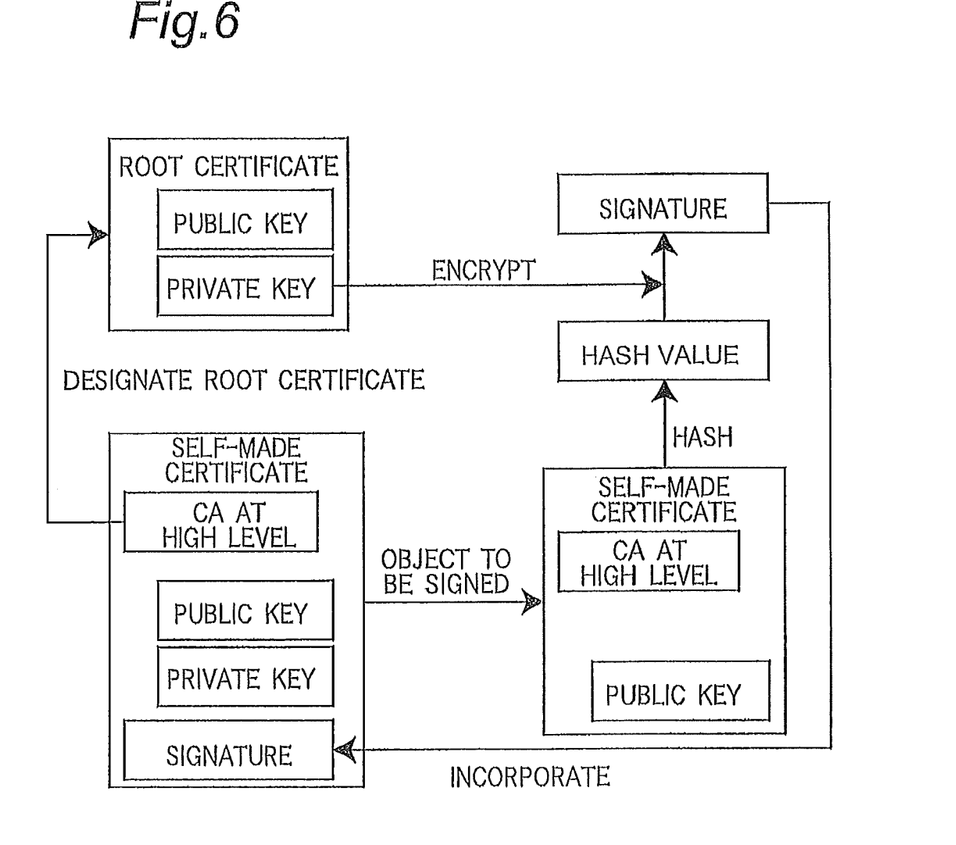
FIG. 6 is a diagram for explaining verification by using a root certificate and a self-made certificate.

With reference to FIG. 5, it is explained further how to deal with certificates. The device 100 holds a root certificate. In SSL communication, a pair of a public key and a private key is created, and a self-made certificate including the public key is created. A certificate chain consists of two hierarchical layers of a root certificate and a self-made certificate. As shown in FIG. 6, the self-made certificate designates the root certificate as the certificate authority at a high level. For electronic signature, the device 100 obtains a hash value on the self-made certificate including the root certificate as a certificate authority at the high level by using a predetermined hash function, performs the signature and adds it to the self-made certificate. Then, the data and the self-made certificate are transmitted in SSL protocol to the client 200.

For the verification of the public key of a certificate authority, a certificate of another certificate authority at a high level is used. Therefore, a certificate chain, that is, the whole list up to the root certificate authority has to be acquired for the verification of the certificate. Because the root certificate is designated as the certificate of a certificate authority at the higher level, when the client 200 verifies the self-made certificate received from the device 100, it performs verification by using the root certificate already installed therein and decides that the certificate is verified. Thus, the certificate can be verified without using a certificate issued by a certificate authority outside the network 300.

The verification of a certificate is performed as follows.

A) A certificate which signs to the self-made certificate (the root certificate in this example) is found. Because the root certificate exists inside the client 200, the existence of the root certificate is guaranteed. Therefore, a warning is not displayed in the screen at the start of SSL communication.

B) A hash value is decrypted with the public key of the root certificate.

C) Another hash value of the self-made certificate is obtained.

D) Next, the two hash values obtained above are compared each other to confirm that they are the same. If the two values are the same, it is verified that the self-made certificate is not tampered.

Figure 7:
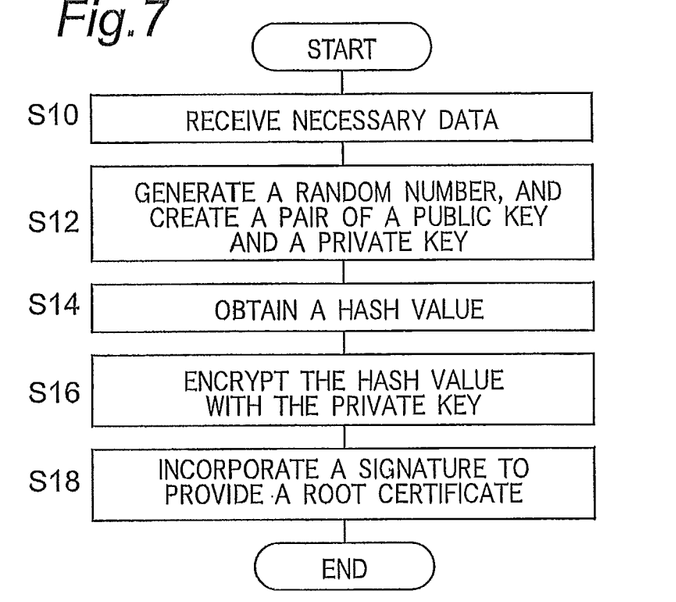
FIG. 7 is a flowchart of creating a root certificate.

FIG. 7 shows a flowchart of the program 122 of creating a root certificate executed by the CPU 110 in the device 100. First, information necessary for creating the certificate is inputted by a user (S10). The information includes, for example, a name of the organization, a name of a section therein, a name of address, a name of country, the expiry date, encryption method, and the like. Next, a random number is created, and a pair of a public key and a private key is created based on the random number (S12). For example, Rivest-Shamir-Adleman scheme is used to create the key. Next, a hash value of the certificate is obtained for example by using an algorithm such as MD5 (S14). Next, the hash value is encrypted with the private key (S16). This is added to the certificate encrypted with the private key, and the certificate incorporating the signature is provided as a root certificate (S18).

Figure 8:
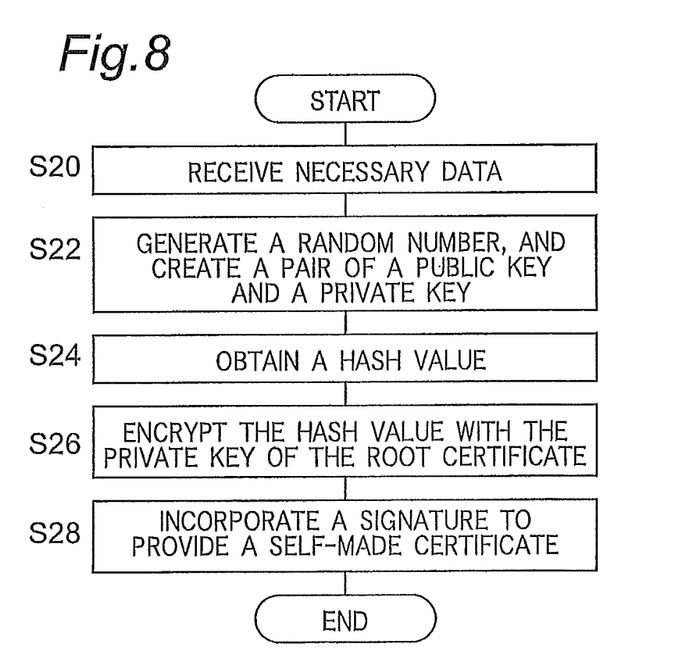
FIG. 8 is a flowchart of creating self-made certificate.

FIG. 8 shows a flowchart of the program 124 of creating a self-made certificate executed by the CPU 110 in the device 100. First, information necessary for creating a certificate is inputted by a user (S20). The information includes, for example, a name of the organization, a name of a section therein, a name of address, a name of country, the expiry date, encryption method, and the like. The root certificate as the information of the issuer as well as the path information at high levels of the certificate are included. Next, a random number is created, and a pair of a public key and a private key is created based on the random number (S22). For example, Rivest-Shamir-Adleman scheme is used for creating the key. Next, a hash value of the certificate is obtained for example by using an algorithm such as MD5 (S24). Next, the hash value is encrypted with the private key of the root certificate (S26). This is added to the certificate encrypted with the private key, and the certificate incorporating the signature is provided as a self-made certificate (S28).

Figure 9:
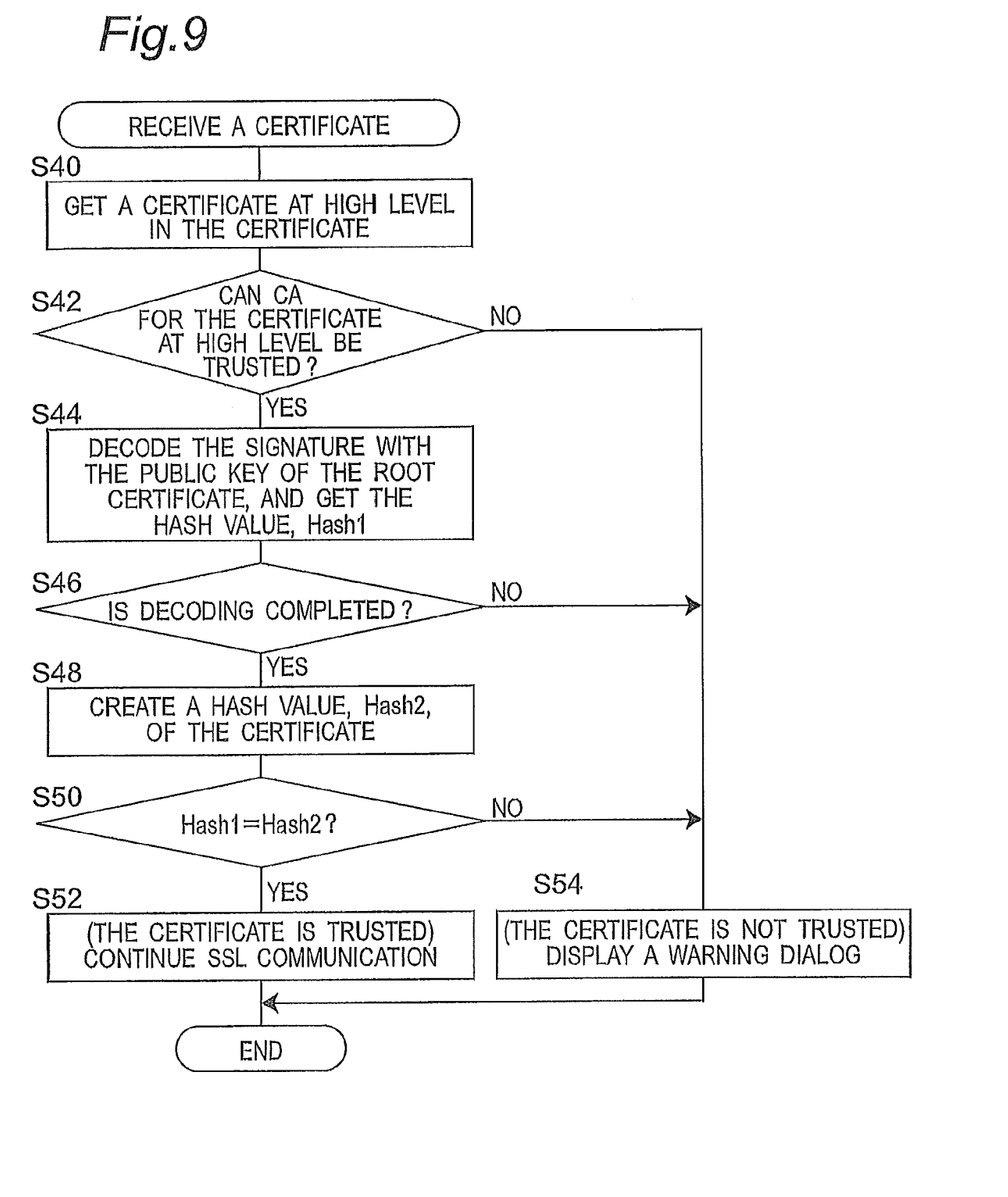
FIG. 9 is a flowchart of verifying the certificate.

FIG. 9 shows a flowchart of the verification of a certificate sent from the device (server) 100 executed by the CPU 202 of the client 200. This is a part only on a root certificate for the verification with SSL protocol in the browser 216. The verification is started when a certificate is received from the device (server) 100. First, a certificate at the high level (the root certificate in this example) is acquired based on the information in the certificate (S40), and it is decided whether or not the certificate authority (CA) at the higher level can be trusted (S42). If the certificate authority is registered as a trusted root certificate in the client 200, or if it is asked to the root certificate through the Internet to find that it is registered as a trusted root certificate, the certificate authority is decided to be trusted. In this example, because the root certificate has been installed beforehand and is registered as a trusted certificate authority, it is decided that the certificate authority at the higher level is trusted. Because the certificate authority at the higher level is trusted, the signature is decrypted with the public key of the root certificate (S44). If the decryption is completed (YES at S46), it is decided that the certificate is verified by the certificate authority at the higher level.

Next, a hash value (Hash2) of the certificate is calculated (S48), and the hash value, Hash2, is compared with the hash value, Hash1, obtained at step S44 (S50). If they agree with each other, it is decided that the received certificate is not tampered, or it is trusted. Then the SSL communication is continued (S52).

On the other hand, if the certificate authority at the higher level is not trusted, or if the signature cannot be decrypted, or if the two hash values, Hash1 and Hash2, are not the same, the certificate is decided not to be trusted. Then, a warning is displayed in the screen of the display device to inform the user of that the certificate is not trusted (S54).

Figure 10:
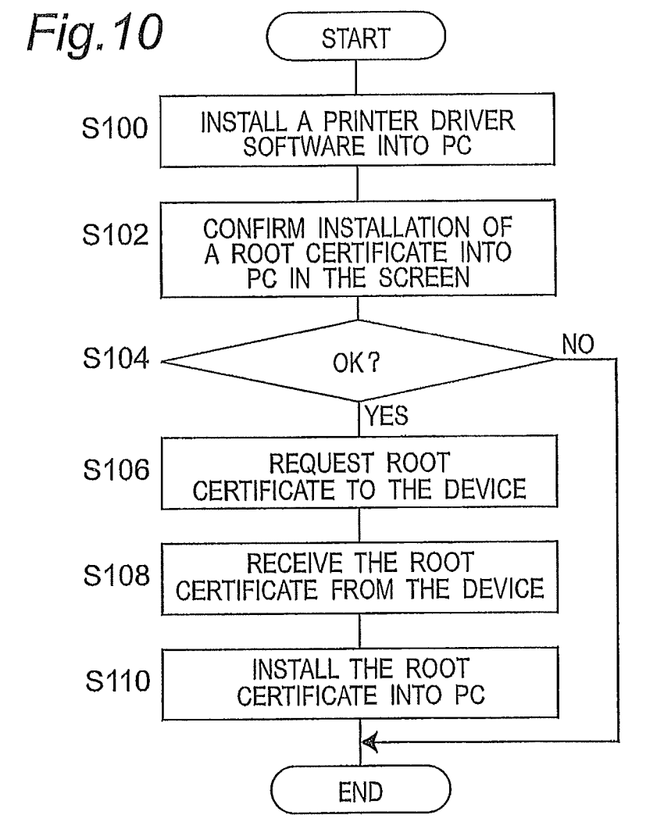
FIG. 10 is a flowchart of a program for installing a root certificate.

Next, installation of the root certificate 220 by the device 100 to the client 200 is explained. In an example of the installation, the device 100 is a multifunctional peripheral or a printer, and when the printer driver 218 is installed, the certificate is sent from the device 100 to the client 200 for installation. FIG. 10 is a flowchart of the installation program 220 executed by the CPU 202 for installing the root certificate simultaneously with the printer driver. First, the printer driver 218 is installed (S100). Next, confirmation on the installation of the root certificate into the client 200 is asked to the user in the screen of the display device (S102). When user's confirmation on the installation is received (YES at S104), the root certificate 126 is requested to the device 100 (S106). When the root certificate 126 is received from the device 100 (S108), it is converted to a root certificate 222 of a predetermined format (S110). The conversion makes it possible to install the root certificate. Then, the converted root certificate 222 is installed to the client 200 (S110).

Preferably, in order to install a root certificate, when the printer driver 218 is installed from the device 100, the client 200 requests the root certificate 126 to the device 100. When it receives the root certificate 126, it converts the received root certificate to a predetermined format and stores the converted root certificate 222.

In another installation method, the certificate received from the device 100 is once stored in the hard disk drive 214 in the client 200 as a file. Then, the certificate is imported in a certificate dialog for managing certificates. In an example, the root certificate received from the device 100 is once stored as a file, and the user installs the root certificate file by using the certificate dialog. After importing the root certificate, the web browser 216 can use the root certificate for the verification.

Figure 11:
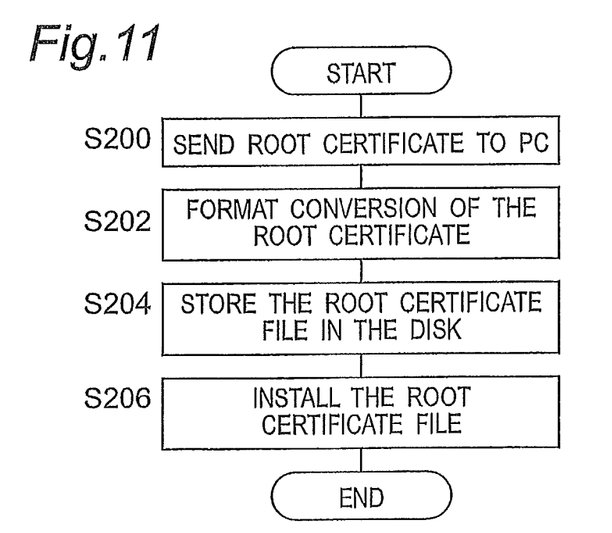
FIG. 11 is a flowchart of another program for installing a certificate.

FIG. 11 shows a flowchart of another installation program of a root certificate executed by the CPU 202 of the client 200. First, a root certificate 126 is received from the device 100 (S200). Then, the format of the root certificate is converted to a predetermined format (S202), and the root certificate file is stored in the hard disk drive 214 (S204). Next, the stored root certificate file is installed (S206). For example, in the case of the browser (Internet Explorer) of the Windows (trademark), a list of installed certificates is displayed in a certificate dialog box. When the certificate is installed, "Import" button in the certificate dialog is clicked to import the certificate to the "trusted root certificate authorities".

The program for installing a root certificate is generated, for example, as an open application program interface (API) of the Windows (trademark) so as to include the above-mentioned function. It may be made open.

In the above-mentioned embodiment, the verification is performed at one step. In a general case, a plurality of certificates at the high levels in the hierarchical order are installed in the client 200. Thus, the client 200 can perform verification by using a certificate chain up to the root certificate authority.

Figure 12:
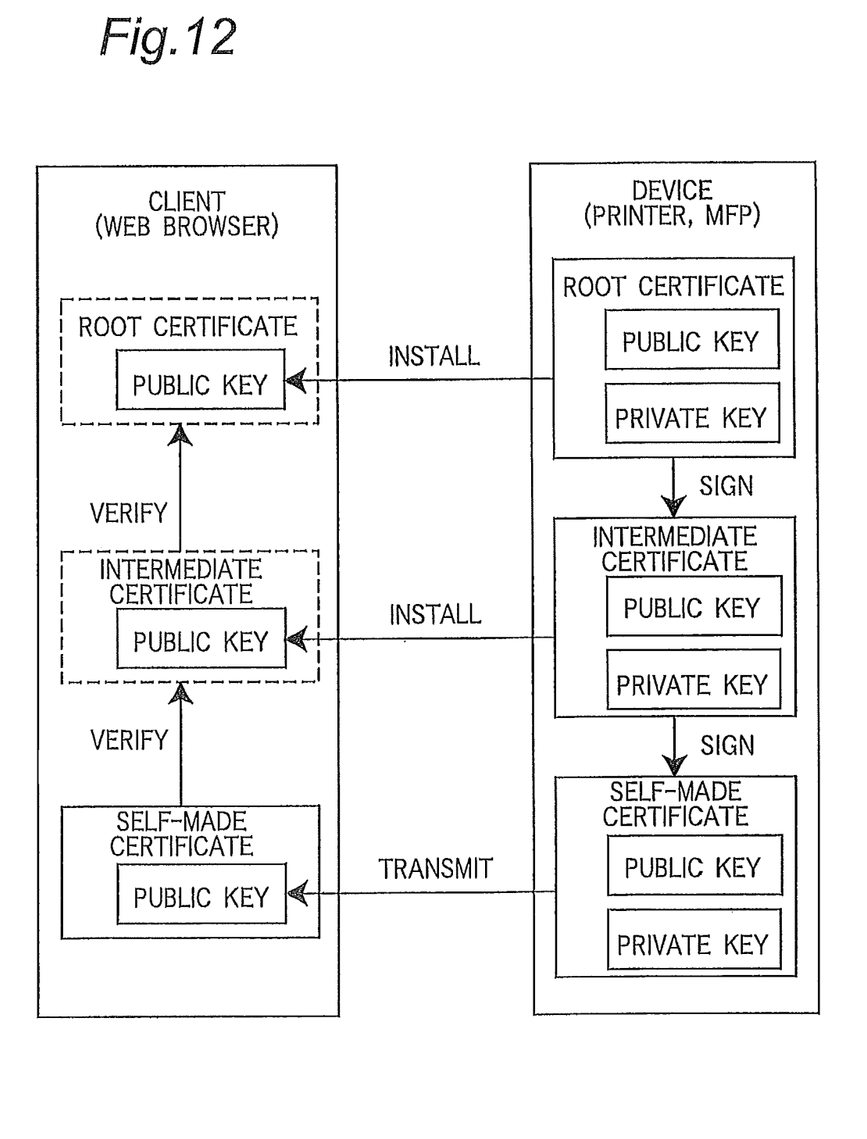
FIG. 12 is a diagram for explaining verification at a plurality of stages.

In an example shown in FIG. 12, a certificate chain has three hierarchical levels of a root certificate, an intermediate certificate and a self-made certificate. The device 100 such as a printer or a multifunctional peripheral holds the root certificate and the intermediate certificate and has installed them beforehand to the client 200. In SSL transmission, the device 100 creates a pair of a public key and a private key and creates a self-made certificate including the public key. The intermediate certificate designates the root certificate as a certificate authority at a higher level and adds the sign to the certificate, and the self-made certificate designates the intermediate certificate as a certificate authority at a higher level and incorporates the sign to the certificate. The device 100 obtains a hash value by using a predetermined hash function on the self-made certificate including the intermediate certificate as a certificate authority at a higher level, performs signature and adds it to the self-made certificate. Then the data and the self-made certificate are transmitted to the client 200. When the client 200 verifies the transmitted self-made certificate, it uses a chain of certificates which have been installed. Because the self-made certificate designates the intermediate certificate as the certificate of a certificate authority at higher level, the verification is performed by using the installed intermediate certificate. Further, the intermediate certificate is verified by using the root certificate already installed. Thus, the self-made certificate is decided a trusted certificate.

In the above-mentioned embodiment on the communication of encrypted data, communication with SSL protocol is explained. However, the invention can generally be applied to a system which uses a public key encryption scheme and performs verification by using a chain of certificates to the root certificate authority. In such a system, a server apparatus such as the device holds a root certificate, and the root certificate is installed beforehand in a client connected through a network. When the client receives data in a public key encryption scheme, it uses the installed root certificate for verifying the certificate received from the server apparatus. After the verification, communication of encrypted data is started. In the above-mentioned embodiment, a session key is used, but the communication is not limited to a method using the session key.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image forming apparatus which communicates with a client through a network, the image forming apparatus comprising:
    a storage device which stores a first certificate created in the image forming apparatus, the first certificate created in the image forming apparatus including a public key paired with a private key, the image forming apparatus comprising a certificate creator configured to create the first certificate by signing the first certificate with the private key; and
    a communication device which transmits the first certificate stored by the storage device to the client for installation;
    wherein the communication device is configured to transmit a second certificate, which includes path information to the first certificate stored in the image forming apparatus, to the client when a connection for encrypted communication is requested by the client after the first certificate stored in the image forming apparatus is installed in the client,
    wherein the second certificate transmitted by the communication device to the client when the request for encrypted communication is requested by the client designates the first certificate as a certificate authority at a higher level and is signed with the private key used to sign the first certificate, and
    wherein the client is configured to, upon receiving the second certificate after requesting the connection for encrypted communication, verify the signature of the second certificate received from the image forming apparatus with the first certificate installed in the client.

2. The image forming apparatus according to claim 1, wherein the image forming apparatus includes a scanner and a printer.

3. The image forming apparatus according to claim 1, wherein the image forming apparatus is a multi-functional peripheral.

4. The image forming apparatus according to claim 1, wherein the storage device is a hard disk drive.

5. The image forming apparatus according to claim 1, wherein the second certificate transmitted to the client after the first certificate stored in the image forming apparatus is installed in the client, is in the same format as the first certificate stored in the image forming apparatus.

6. The image forming apparatus according to claim 1, wherein the second certificate includes an identification of an issuer of the first certificate stored in the image forming apparatus.

7. The image forming apparatus according to claim claim 1, wherein:

the client is configured to store the public key of the installed first certificate, prior to the client requesting the connection for encrypted communication to the image forming apparatus; and the client is configured to verify the signature of the second certificate received from the communication device of the image forming apparatus by decrypting the second certificate with the public key of the first certificate installed in the client.

8. An image forming apparatus which communicates with a client through a network, the image forming apparatus comprising:

a storage device which stores a first certificate created in the image forming apparatus, the first certificate created in the image forming apparatus includes a public key paired with a private key, the image forming apparatus comprising a certificate creator configured to create the first certificate by signing the first certificate with the private key; and a communication device which transmits the first certificate stored by the storage device to the client based on a designation by the client;

wherein the communication device is configured to transmit a second certificate, which includes path information to the first certificate stored in the image forming apparatus, to the client when a connection for encrypted communication is requested by the client in which the first certificate stored in the image forming apparatus is installed, wherein the second certificate transmitted by the communication device to the client when the request for encrypted communication is requested by the client designates the first certificate as a certificate authority at a higher level and is signed with the private key used to sign the first certificate, and wherein the client is configured to, upon receiving the second certificate after requesting the connection for encrypted communication, verify the signature of the second certificate received from the image forming apparatus with the first certificate installed in the client.

9. The image forming apparatus according to claim 8, wherein the image forming apparatus includes a scanner and a printer.

10. The image forming apparatus according to claim 8, wherein the image forming apparatus is a multi-functional peripheral.

11. The image forming apparatus according to claim 8, wherein the storage device is a hard disk drive.

12. The image forming apparatus according to claim 8, wherein the second certificate transmitted to the client after the first certificate stored in the image forming apparatus is installed in the client, is in the same format as the certificate stored in the image forming apparatus.

13. The image forming apparatus according to claim 8, wherein the second certificate includes an identification of an issuer of the first certificate stored in the image forming apparatus.

14. The image forming apparatus according to claim 8, wherein:

the client is configured to store the public key of the installed first certificate, prior to the client requesting the connection for encrypted communication to the image forming apparatus; and the client is configured to verify the signature of the second certificate received from the communication device of the image forming apparatus by decrypting the second certificate with the public key of the first certificate installed in the client.

15. An image forming apparatus which communicates with a client through a network, the image forming apparatus comprising:

a storage device which stores a first certificate created in the image forming apparatus, the first certificate created in the image forming apparatus including a public key paired with a private key, the image forming apparatus comprising a certificate creator configured to create the first certificate by signing the first certificate with the private key; and a communication device which transmits the first certificate stored by the storage device to the client for installation;

wherein the communication device is configured to transmit a second certificate, which includes path information to the first certificate stored in the image forming apparatus, to the client when a connection for encrypted communication is requested by the client after the first certificate stored in the image forming apparatus is installed in the client, wherein the second certificate transmitted by the communication device to the client when the request for encrypted communication is requested by the client is signed with the private key used to sign the first certificate, and wherein the client is configured to, upon receiving the second certificate after requesting the connection for encrypted communication, verify the signature of the second certificate received from the image forming apparatus with the first certificate installed in the client.

16. The image forming apparatus according to claim 15, wherein the second certificate transmitted to the client after the first certificate stored in the image forming apparatus is installed in the client, is in the same format as the first certificate stored in the image forming apparatus.

17. The image forming apparatus according to claim 15, wherein the second certificate includes an identification of an issuer of the first certificate stored in the image forming apparatus.

18. The image forming apparatus according to claim 15, wherein: the client is configured to store the public key of the installed first certificate, prior to the client requesting the connection for encrypted communication to the image forming apparatus; and the client is configured to verify the signature of the second certificate received from the communication device of the image forming apparatus by decrypting the second certificate with the public key of the first certificate installed in the client.

19. An image forming apparatus which communicates with a client through a network, the image forming apparatus comprising:

a storage device which stores a first certificate created in the image forming apparatus, the first certificate created in the image forming apparatus includes a public key paired with a private key, the image forming apparatus comprising a certificate creator configured to create the first certificate by signing the first certificate with the private key; and a communication device which transmits the first certificate stored by the storage device to the client based on a designation by the client;

wherein the communication device is configured to transmit a second certificate, which includes path information to the first certificate stored in the image forming apparatus, to the client when a connection for encrypted communication is requested by the client in which the first certificate stored in the image forming apparatus is installed, wherein the second certificate transmitted by the communication device to the client when the request for encrypted communication is requested by the client is signed with the private key used to sign the first certificate, and wherein the client is configured to, upon receiving the second certificate after requesting the connection for encrypted communication, verify the signature of the second certificate received from the image forming apparatus with the first certificate installed in the client.

20. The image forming apparatus according to claim 19, wherein the second certificate transmitted to the client after the first certificate stored in the image forming apparatus is installed in the client, is in the same format as the certificate stored in the image forming apparatus.

21. The image forming apparatus according to claim 19, wherein the second certificate includes an identification of an issuer of the first certificate stored in the image forming apparatus.

22. The image forming apparatus according to claim 19, wherein:

the client is configured to store the public key of the installed first certificate, prior to the client requesting the connection for encrypted communication to the image forming apparatus; and the client is configured to verify the signature of the second certificate received from the communication device of the image forming apparatus by decrypting the second certificate with the public key of the first certificate installed in the client.

* * * * *